United States Patent
Kingma et al.

(10) Patent No.: US 7,939,177 B2
(45) Date of Patent: May 10, 2011

(54) LIGNOCELLUOSIC MATERIAL WHICH IS LOW IN FORMALDEHYDE AND METHOD FOR THE PRODUCTION THEREOF

(75) Inventors: Arend Jouke Kingma, Ludwigshafen (DE); Franz Weingart, Weinheim (DE); Stefan Schaffert, Bensheim (DE); Holger Militz, Bovenden (DE); Andreas Krause, Bovenden (DE); Falko Wepner, Rosenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 27 days.

(21) Appl. No.: 12/089,209

(22) PCT Filed: Oct. 2, 2006

(86) PCT No.: PCT/EP2006/066958
§ 371 (c)(1),
(2), (4) Date: Apr. 4, 2008

(87) PCT Pub. No.: WO2007/039591
PCT Pub. Date: Apr. 12, 2007

(65) Prior Publication Data
US 2008/0220277 A1    Sep. 11, 2008

(30) Foreign Application Priority Data
Oct. 4, 2005   (DE) .................. 10 2005 047 363

(51) Int. Cl.
C07C 69/34    (2006.01)

(52) U.S. Cl. ........ 428/532; 428/536; 428/326; 427/254; 264/83

(58) Field of Classification Search .......... 428/532, 428/536, 326; 427/254; 264/83
See application file for complete search history.

(56) References Cited

U.S. PATENT DOCUMENTS

| | | | |
|---|---|---|---|
| 4,654,259 A * | 3/1987 | Stofko .......... | 428/326 |
| 4,678,686 A * | 7/1987 | Park ............. | 427/254 |
| 4,716,054 A | 12/1987 | Stanek et al. | |
| 4,937,024 A * | 6/1990 | Hickson ........ | 264/83 |
| 5,268,502 A * | 12/1993 | Pacifici ......... | 560/198 |
| 2006/0051607 A1 | 3/2006 | Krause et al. | |
| 2006/0194901 A1 | 8/2006 | Krause et al. | |

FOREIGN PATENT DOCUMENTS

| | | |
|---|---|---|
| DE | 203 13 424 | 10/2004 |
| EP | 0 213 252 | 3/1987 |
| GB | 2 365 029 | 2/2002 |
| WO | 84 01159 | 3/1984 |
| WO | 90 06840 | 6/1990 |
| WO | 00 24800 | 5/2000 |
| WO | WO00/24800 * | 5/2000 |
| WO | 2004 033170 | 4/2004 |
| WO | 2004 033171 | 4/2004 |
| WO | 2006 092330 | 9/2006 |
| WO | 2006 092331 | 9/2006 |
| WO | 2006 117158 | 11/2006 |
| WO | 2006 117159 | 11/2006 |
| WO | 2006 117160 | 11/2006 |
| WO | 2006 117162 | 11/2006 |
| WO | 2006 117163 | 11/2006 |

OTHER PUBLICATIONS

Rowell, Roger M. et al., "Dimensional Stability, Decay Resistance, and Mechanical Properties of Veneer-faced Low-density Particleboards Made from Acetylated Wood", Wood and Fibre Science, vol. 21, No. 1, pp. 67-79 1988.
Militz, H., "Treatment of timber with water soluble dimethylol resins to improve their dimensional stability and durability", Wood Science and Technology, vol. 27, pp. 347-355, 1993.
U.S. Appl. No. 11/912,534, filed Oct. 25, 2007, Kingma et al.
U.S. Appl. No. 11/913,080, filed Oct. 30, 2007, Kingma et al.
U.S. Appl. No. 11/912,594, filed Oct. 25, 2007, Kingma et al.
U.S. Appl. No. 11/817,511, filed Aug. 31, 2007, Baus et al.
U.S. Appl. No. 11/817,284, filed Aug. 28, 2007, Kingma et al.
U.S. Appl. No. 12/088,702, filed Mar. 31, 2008, Kingma et al.

* cited by examiner

*Primary Examiner* — Leszek Kiliman
(74) *Attorney, Agent, or Firm* — Oblon, Spivak, McClelland, Maier & Neustadt, L.L.P.

(57) ABSTRACT

The invention relates to a lignocellulose material comprising a crosslinkable nitrogen compound, technically a formaldehyde condensate, in crosslinked form in a constituent amount (N) of at least 1% by weight, calculated as nitrogen and based on the total weight of the lignocellulose material, in which the ratio (FA/N) of formaldehyde emission (FA), determined by means of the bottle method according to EN 717, part 3, to constituent amount of the nitrogen compound (N) exhibits a value of at most $5.0 \times 10^{-3}$, and to a process for the preparation thereof.

23 Claims, No Drawings

LIGNOCELLUOSIC MATERIAL WHICH IS LOW IN FORMALDEHYDE AND METHOD FOR THE PRODUCTION THEREOF

The present invention relates to low- or zero-formaldehyde lignocellulose materials comprising crosslinkable nitrogen compounds in crosslinked form and to a process for their preparation.

Lignocellulose materials, in particular wood but also other lignocellulose materials such as bamboo, natural fibers and the like, are of interest as building and construction materials for many applications. One disadvantage is that the natural durability of these materials is disadvantageously affected both by the effect of moisture and by changes in the moisture content in the surrounding atmosphere. The reason for this is the property of lignocellulose materials, on contact with water or in a moist atmosphere, of taking up water and of releasing it again in a dry atmosphere. The swelling or shrinking which accompanies this and the lack of dimensional stability of the materials associated with this is not only undesirable for many applications but can in the extreme case also result in destruction of the material by cracking. Moreover, these materials in the moist state are attacked by wood-decomposing or wood-discoloring microorganisms, which in many cases makes necessary the finishing of these materials with fungicides or biocides. Apart from the cost aspect, such a finishing is also disadvantageous from ecological considerations.

To improve the durability and dimensional stability, wood and comparable lignocellulose-based materials are frequently modified, e.g. by treatment with wax-comprising impregnating agents. Through this, penetration of water into the pores of the material is made more difficult, the dimensional stability of these materials is improved and the danger of infection by fungi or bacteria is reduced.

The proposal has been made to improve the dimensional stability of wood and wood materials, such as particle boards and fiber boards, and their resistance to wood-destroying organisms by the acetylation of the wood particles using anhydrides, such as acetic anhydride (see EP-A 213 252 and the literature cited therein, and also Rowell et al., Wood and Fiber Science, 21(1), pp. 67-79). The high costs of the treatment and the unpleasant inherent smell of the material thus treated are so disadvantageous that these measures have not been successful commercially.

It is known, from the publication "Treatment of timber with water soluble dimethylol resins to improve the dimensional stability and durability", which appeared in Wood Science and Technology, 1993, pages 347-355, in order to improve the shrinking and swelling properties of wood and the resistance to fungi and insects, to treat this with an impregnating agent consisting of an aqueous solution of dimethyloldihydroxyethylene-urea (DMDHEU or 1,3-bis(hydroxymethyl)-4,5-dihydroxyimidazolidin-2-one) and a catalyst. At elevated temperature, the DMDHEU reacts with itself and the wood. In this way, wooden articles with dimensions of 20 mm×20 mm×10 mm were investigated. The process described can only be applied when the wooden articles are of small dimensions because these are susceptible to cracking when of larger dimensions.

WO 2004/033170 discloses a process for the production of a wooden article with increased durability, dimensional stability and surface hardness in which a crosslinkable urea compound, such as 1,3-bis(hydroxymethyl)-4,5-dihydroxy-imidazolidin-2-one, a bis(hydroxymethyl)-4,5-dihydroxy-imidazolidin-2-one modified with alkanols or polyols, 1,3-dimethyl-4,5-dihydroxyimidazolidin-2-one, dimethylolurea, 1,3-bis(methoxymethyl)urea, tetra(hydroxymethyl)acetylenediurea, 1,3-bis(hydroxy-methyl)imidazolidin-2-one, 1-hydroxymethyl-3-methylurea or a mixture thereof, is used as impregnating agent and the impregnated wooden article is cured at elevated temperature while maintaining moist conditions. The formaldehyde emission of the wood material thus obtained is unsatisfactory and the fixing of the urea compound in the wood is only moderate.

WO 2004/033171 discloses a process for the treatment of wood in which an untreated wooden article is impregnated with an aqueous solution comprising a crosslinkable nitrogen compound from the group of the 1,3-bis(hydroxymethyl)-4,5-dihydroxy-imidazolidin-2-ones modified with a $C_{1-5}$-alcohol, a polyol or their mixtures (mDMDHEU), if appropriate 1,3-bis(hydroxymethyl)-4,5-dihydroxyimidazolidin-2-one, 1,3-dimethyl-4,5-dihydroxyimidazolidin-2-one, dimethylolurea, bis(methoxymethyl)urea, tetramethylolacetylenediurea, 1,3-bis(hydroxymethyl)imidazolidin-2-one or methylol-methylurea as additional impregnating agent, and a catalyst which brings about the crosslinking of these compounds. This process should, inter alia, also lead to a reduction in the formaldehyde emission of the wooden article manufactured. Low-emission wood materials with a simultaneously high content of urea compound are not described therein.

PCT/EP2006/004020 (the prior German patent application DE 102005020387.6) discloses the surface treatment of moldings made of modified wood or modified wood materials or other materials made of modified lignocellulose materials, in which the modified wood material or the modified material made of the lignocellulose material is, as in WO 2004/033170 and WO 2004/033171, previously impregnated and crosslinked with crosslinkable nitrogen compounds.

PCT/EP2006/004019 (the prior German patent application DE 102005020386.8) discloses modified wood materials impregnated and crosslinked with a reactive composition based on crosslinkable nitrogen compounds which, in addition to at least one crosslinkable nitrogen compound, comprises at least one effect substance in dissolved or dispersed form.

PCT/EP2006/004016 and PCT/EP2006/004014 (the prior German patent applications DE 102005020390.6 and DE 102005020389.2) disclose modified wood materials impregnated and crosslinked with a reactive composition which, in addition to at least one crosslinkable nitrogen compound, comprises a dispersed hydrophobic constituent.

PCT/EP2006/001979 (the prior German patent application DE 102005010042.2) discloses modified wood materials made of finely divided wood materials in which the finely divided wood material is impregnated with a reactive composition based on crosslinkable nitrogen compounds and is subjected to a molding process in which crosslinking was carried out simultaneously. The crosslinking can also be carried out before the molding process.

PCT/EP2006/001980 (the prior German patent application DE 102005010041.4) discloses modified wood materials exhibiting at least one thin veneer layer adhesively bonded in a planar fashion to a substrate or additional veneer layers, in which the thin veneer layer is impregnated with a reactive composition based on crosslinkable nitrogen compounds, treated with adhesive and adhesively bonded to a veneer.

PCT/EP2006/004015 (the prior German patent application DE 102005020388.4) discloses modified wood materials impregnated and crosslinked with a reactive composition which comprises a) at least one low molecular weight compound V which exhibits at least two N-bonded groups of the formula CH$_2$OH and/or a 1,2-bishydroxyethane-1,2-diyl group bridging two nitrogen atoms, and b) at least one oligo- or polyalkylene ether polyol P with on average at least 2 OH groups, in particular 2 to 6 OH groups, per molecule which exhibits at least one divalent or polyvalent aliphatic or cycloaliphatic group with at least 3 carbon atoms, in particular with 3 to 10 carbon atoms, and/or c) a reaction product of a low molecular weight compound V with the polyalkylene ether polyol.

The abovementioned modifying processes comprise the use of crosslinkable nitrogen compounds comprising groups capable of releasing formaldehyde. A current requirement of modified lignocellulose products, such as modified wood, is the greatest possible avoidance of formaldehyde emissions with simultaneously high content of crosslinkable nitrogen compounds. Alternative impregnating agents which, because of their chemical composition, do not result in any or result in only low formaldehyde emissions cannot, however, produce the desired material properties. A reduction in the amounts of the crosslinkable nitrogen compounds used in order to reduce the formaldehyde emissions is only possible to a limited extent since, below a minimum amount used, the desired performance properties are no longer obtained. Moreover, many alternative impregnating agents and the fungicides and biocides which may then be necessary are also not completely harmless under ecological considerations.

It has been found, surprisingly, that lignocellulose materials with a favorable ratio of formaldehyde emission to the amount of the crosslinkable nitrogen compound used for the impregnation are obtained, by impregnating a lignocellulose material with an aqueous solution of a crosslinkable nitrogen compound and subsequently carrying out crosslinking at elevated temperature, if the impregnated lignocellulose material is first subjected to treatment with superheated steam and subsequently to treatment at temperatures of greater than 110° C. and low humidity of the surrounding gas volume. Moreover, this process results in good fixing of the nitrogen compound. In addition, crack formation does not occur.

A first subject-matter of the invention is accordingly a lignocellulose material comprising a crosslinkable nitrogen compound, technically a formaldehyde addition product, in crosslinked form in a constituent amount (N) of at least 1% by weight, calculated as nitrogen and based on the total weight of the lignocellulose material, in which the ratio (FA/N) of formaldehyde emission (FA), determined by means of the bottle method according to EN 717, part 3, to constituent amount of the nitrogen compound (N) exhibits a value of at most $5.0 \times 10^{-3}$, in particular a value of at most $3.5 \times 10^{-3}$ and in particular a value of at most $3.0 \times 10^{-3}$.

In the context of the present application, the term "nitrogen compound, technically a formaldehyde addition product," is understood to mean a compound which can be obtained technically by addition of formaldehyde to the NH group(s) of a compound exhibiting NH groups, as represented in the following overall reaction equation:

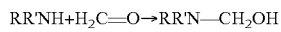

In this connection, RR'NH is the compound exhibiting an NH group. The "nitrogen compound, technically a formaldehyde addition product," can be both compounds actually obtained by reaction of formaldehyde with an appropriate compound comprising NH groups as well as compounds obtained by other synthetic routes, e.g. by reaction of the compound comprising NH groups with synthetic equivalents of formaldehyde, in which, however, a potential source of formaldehyde emission likewise results.

The formaldehyde emission (FA) in mg per 100 g of lignocellulose material is determined by means of the bottle method according to EN 717, part 3. Generally, the value for the formaldehyde emission of the lignocellulose material according to the invention is at most 15 mg/100 g, preferably at most 12 mg/100 g, particularly preferably at most 10 mg/100 g and in particular at most 8 mg/100 g.

The lignocellulose materials impregnated by the process according to the invention are characterized by very good fixing of the modifying agent and exhibit, in comparison to conventionally modified materials, an increased biological durability. Generally, the lignocellulose materials according to the invention exhibit degrees of fixing of more than 73%, frequently of more than 78%, in particular of more than 80% and particularly preferably of more than 85%. The term "degree of fixing" is understood to mean the percentage of nitrogen compound present in the modified lignocellulose material which can no longer be extracted with water. The extractable proportion is determined via the nitrogen content of a modified lignocellulose material before and after extraction with hot water. For this, a modified lignocellulose material is milled to give a powder and dried absolutely ("absolutely" is understood to mean a water content of 0%) and the nitrogen content in the lignocellulose material is determined by means of elemental analysis. Subsequently, a test sample of the powder is extracted with water at 80° C. for 16 h, filtered off and again dried absolutely and the nitrogen content of the test sample thus obtained is determined by means of elemental analysis. Since unmodified lignocellulose material itself comprises no detectable amounts of nitrogen, the extractable proportion in %, based on the nitrogen value of the test sample before extraction, results directly from the difference in the nitrogen contents before and after the extraction (method A). Alternatively, and with even higher accuracy, the degree of fixing, thus the nitrogen content which can no longer be extracted with water, can also be determined according to the standard DIN EN 84. For this, the test specimen is first evacuated for 20 minutes in deionized water in a container. After 2 hours, the water is changed for the first time. After a further 24 h, the water is changed for the 2nd time. Altogether, the water is changed 9 times in the 24 h phase (with the exception of the weekend). After the leaching, the test sample is dried, ground and dried absolutely and the nitrogen content of the test sample thus obtained is determined by means of elemental analysis. The lower limits given above for the degrees of fixing are also valid for the values determined according to DIN EN 84.

The term "distributed in the lignocellulose material" means that the crosslinked nitrogen compound is distributed more or less uniformly over the cross section of the lignocellulose material and is not found only on the surface or in cavities of the lignocellulose material.

The amount of the crosslinkable nitrogen compound in the lignocellulose material is according to the invention at least 1% by weight, frequently at least 1.5% by weight, in particular at least 1.8% by weight, particularly preferably at least 2.0% by weight and especially at least 2.3% by weight or above, in each case calculated as nitrogen and based on the total weight of the lignocellulose material. The amount of the crosslinkable nitrogen compound typically ranges from 1 to 25% by weight, frequently from 1.5 to 20% by weight, in particular from 1.8 to 18% by weight, particularly preferably from 2.0 to 15% by weight and especially from 2.3 to 12% by weight, in each case calculated as nitrogen and based on the total weight of the lignocellulose material. The nitrogen content can be determined by means of elemental analysis.

Due to the different densities of wood, higher contents of nitrogen compound are generally achieved with types of wood with low densities, such as pine (*Pinus* spp.), spruce or poplar, preferably contents of at least 2.5% by weight, in particular at least 3% by weight, e.g. ranging from 2.5 to 20% by weight or 3 to 15% by weight. With types of wood with greater densities, such as beech, maple or ash, the content of nitrogen compound, calculated as nitrogen and based on the total weight of the lignocellulose material, preferably ranges from 1.8 to 15% by weight and in particular from 2 to 12% by weight.

Based on the total volume of the lignocellulose material, the content of nitrogen compound, calculated as nitrogen, is preferably at least 11 kg/m$^3$, in particular at least 12 kg/m$^3$ and especially at least 13 kg/m$^3$, e.g. 11 to 120 kg/m$^3$, preferably 12 to 100 kg/m$^3$, in particular 13 to 80 kg/m$^3$.

All details with regard to the content of crosslinkable nitrogen compound refer to the total weight of the modified lignocellulose material and are to be understood as average values of generally at least 5 individual determinations which, for large-size lignocellulose materials, such as solid wooden articles, are determined over the complete cross section of the lignocellulose material.

In a preferred embodiment of the invention, the chloride content of the lignocellulose material according to the invention, based on the total weight of the lignocellulose material, is at most 0.1% by weight, in particular at most 0.05% by weight and particularly preferably at most 0.01% by weight. The use of metal chlorides, such as magnesium chloride, zinc chloride, lithium chloride and aluminum chloride, as catalyst for the curing/crosslinking is preferably avoided in the preparation of such lignocellulose materials.

The lignocellulose materials according to the invention exhibit a favorable ratio of formaldehyde emission to the amount of the nitrogen compound used for the impregnation, even if no nitrogen compounds modified with alcohols, such as mDMDHEU, are used as nitrogen compound for the impregnation. A specific embodiment is accordingly a lignocellulose material comprising no nitrogen compound in crosslinked form derived from formaldehyde addition products, such as 1,3-bis-(hydroxymethyl)-4,5-dihydroxyimidazolidin-2-ones modified with a $C_1$-$C_6$-alkanol, a $C_2$-$C_6$-polyol or an oligoalkylene glycol (=modified DMDHEU or mDMDHEU).

Preference is given to lignocellulose materials comprising, as nitrogen compound, exclusively 1,3-bis(hydroxymethyl)-4,5-dihydroxyimidazolidin-2-one (DMDHEU) in crosslinked form.

Another likewise preferred embodiment in turn relates to a lignocellulose material comprising a nitrogen compound in crosslinked form derived from formaldehyde addition products modified with a $C_1$-$C_6$-alkanol, a $C_2$-$C_6$-polyol or an oligoalkylene glycol. Mention may be made here, as crosslinkable compounds, in addition to modified 1,3-bis(hydroxymethyl)-4,5-dihydroxyimidazolidin-2-one (=modified DMDHEU or mDMDHEU), in particular also of modified melamine-formaldehyde addition products, e.g. modified melamine-formaldehyde addition products which can be obtained by reaction of melamine with 2 to 6 and in particular 3 to 5 mol of formaldehyde per mole of melamine and 2 to 6, in particular 3 to 5, mol of $C_1$-$C_6$-alkanols and/or $C_2$-$C_6$-polyols per mole of melamine, in particular with $C_1$-$C_2$-alkanols, such a methanol. In this connection, the molar ratio of formaldehyde to alcohol preferably ranges from 0.5:1 to 1:2.

Lignocellulose materials with the properties described above can be obtained by impregnating a lignocellulose material with an aqueous solution of a crosslinkable nitrogen compound and by subsequently subjecting it to treatment both with superheated steam and at low humidity of the surrounding gas volume. An additional subject-matter of the invention is accordingly a process for the preparation of lignocellulose materials as described above, comprising a) impregnating the lignocellulose material with an aqueous composition comprising i) at least one crosslinkable nitrogen compound and ii) at least one substance which catalyzes the crosslinking, b) treating the impregnated lignocellulose material at elevated temperature in order to remove the water and to crosslink the crosslinkable nitrogen compound, wherein the process stage b) comprises at least one treatment of the impregnated lignocellulose material with superheated steam and at least one subsequent treatment at a temperature of greater than 110° C. and a relative humidity of the gaseous medium surrounding the lignocellulose material of at most 20%.

All lignocellulose materials, independently of their material or structural composition or of their format, are suitable in principle for use in the process according to the invention. These also include lignocellulose materials which have already been pretreated, provided that they can be impregnated with an aqueous composition comprising at least one crosslinkable nitrogen compound and at least one substance which catalyzes the crosslinking and the impregnated lignocellulose material can subsequently be subjected to crosslinking. Suitable lignocellulose materials are, e.g., wood, in particular solid wood, but also veneers and finely divided lignocellulose materials, such as shavings, fibers or strands, for the manufacture of wood-base material and veneer lumber.

The finely divided lignocellulose materials include fibers, shavings, strands, chips, parings and the like. The term "veneers" is understood to mean flat thin wood materials with thicknesses ≦5 mm, in particular ≦1 mm. In particular, large-size parts with minimum sizes of greater than 1 mm, in particular >5 mm and especially ≧10 mm and especially large-size parts made of solid wood are impregnated in stage a).

All wood types are suitable in principle for the manufacture of modified wood materials, preferably those which can absorb at least 30%, in particular at least 50%, of their dry weight of water and particularly preferably those which are categorized in the impregnability categories 1 and 2 according to DIN EN 350-2. These include, for example, wood from conifers, such as pine (*Pinus* spp.), spruce, Douglas fir, larch, stone pine, fir, grand fir, cedar and Swiss pine, and wood from deciduous trees, e.g. maple, hard maple, acacia, ayous, birch, pear, beech, oak, alder, aspen, ash, wild service, hazel, hornbeam, cherry, chestnut, lime, American walnut, poplar, olive, robinia, elm, walnut, gum, zebrano, willow, Turkey oak and the like. Since even inexpensive wood is, as a result of the impregnation, endowed with properties otherwise only exhibited by wood from tropical forests, for example an extremely low swelling/shrinking behavior, high strengths and good weathering resistance, a particular embodiment of the invention is the use of modified wood or wood materials having a wood constituent chosen from beech, spruce, pine, birch, poplar, ash and maple.

The process according to the invention is also suitable for the impregnation of other lignocellulose materials other than wood, e.g. of natural fibrous materials, such as bamboo, bagasse, cotton stems, jute, sisal, straw, flax, coconut fibers, banana fibers, reeds, e.g. Chinese silvergrass, ramie, hemp, manila hemp, esparto (alfa grass), rice husks and cork.

Suitable crosslinkable nitrogen compounds for use in stage a) of the process according to the invention are α) low molecular weight compounds V which exhibit at least one, in particular at least two, N-bonded groups of the formula $CH_2OR$, in which R is $C_1$-$C_4$-alkyl or in particular hydrogen, and, if appropriate, a 1,2-bishydroxyethane-1,2-diyl group bridging two nitrogen atoms, β) precondensates of the compound V, and γ) reaction products or mixtures of the compound V with at least one alcohol chosen from $C_1$-$C_6$-alkanols, $C_2$-$C_6$-polyols and oligoalkylene glycols.

The crosslinkable nitrogen compounds of the groups α), β) and γ) used for the impregnation of the lignocellulose material in stage a), i.e. compounds V, their precondensates and their reaction products, are preferably low molecular weight compounds or oligomers with low molecular weights which are present in the aqueous composition used generally in the completely dissolved form. The molecular weight of the crosslinkable compound is usually less than 400 daltons. It is assumed that the crosslinkable nitrogen compounds, because of these properties, can penetrate into the cell walls of the wood and, on curing, improve the mechanical stability of the cell walls and reduce the swelling thereof brought about by water.

Examples of crosslinkable nitrogen compounds are, without being limited thereto:

1,3-bis(hydroxymethyl)-4,5-dihydroxyimidazolidin-2-one (DMDHEU),
1,3-bis(hydroxymethyl)-4,5-dihydroxyimidazolidin-2-one modified with a $C_1$-$C_6$-alkanol, a $C_2$-$C_6$-polyol or an oligoalkylene glycol (modified DMDHEU or mDMDHEU),
1,3-bis(hydroxymethyl)urea,
1,3-bis(methoxymethyl)urea,
1-hydroxymethyl-3-methylurea,
1-hydroxymethyl-3-methyl-4,5-dihydroxyimidazolidin-2-one,
1-hydroxymethyl-4,5-dihydroxyimidazolidin-2-one,
1,3-bis(hydroxymethyl)imidazolidin-2-one (dimethylethyleneurea),
1,3-bis(hydroxymethyl)-1,3-hexahydropyrimidin-2-one (dimethylolpropyleneurea),
1,3-bis(methoxymethyl)-4,5-dihydroxyimidazolidin-2-one (DMeDHEU),
tetra(hydroxymethyl)acetylenediurea,
low molecular weight melamine-formaldehyde resins (MF resins), such as poly(hydroxymethyl)melamine with at least 2, e.g. 2, 3, 4, 5 or 6, N-hydroxy-methyl groups, such as 3-times methylolated melamine (=2,4,6-tris(N-hydroxy-methylamino)-1,3,5-triazine), and
low molecular weight melamine-formaldehyde resins (MF resins), such as poly(hydroxymethyl)melamine with at least 2, e.g. 2, 3, 4, 5 or 6, N-hydroxy-methyl groups, which are modified with a $C_1$-$C_6$-alkanol, a $C_2$-$C_6$-polyol or an oligoalkylene glycol (modified MF resin),
and mixtures thereof.

Preference is given, among the crosslinkable nitrogen compounds, in particular to the compounds V (group α) and the precondensates thereof (group β). Among these, the compounds of the group α) and especially those with R=H are particularly preferred.

Preference is given, among the compounds V, in particular to low molecular weight compounds $V^x$ which exhibit at least two N-bonded groups of the formula $CH_2OR$, in which R is $C_1$-$C_4$-alkyl or in particular hydrogen, and, if appropriate, a 1,2-bishydroxyethane-1,2-diyl group bridging two nitrogen atoms.

Preference is given, among the compounds V, to urea and urea derivatives carrying a group of the formula $CH_2OR$ on each nitrogen atom of the urea unit (also compounds $V^{x1}$ below), R having the abovementioned meaning and in particular being hydrogen.

Particular preference is given to 3-bis(hydroxymethyl)-4,5-dihydroxyimidazolidin-2-one, 1,3-bis(hydroxymethyl)urea, 1,3-bis(hydroxymethyl)imidazolidin-2-one or tetra(hydroxy-methyl)acetylenediurea and especially to 1,3-bis(hydroxymethyl)-4,5-dihydroxy-imidazolidin-2-one (DMDHEU).

Preference is furthermore given, among the crosslinkable nitrogen compounds, to melamine compounds carrying at least one group of the formula $CH_2OR$ on average on at least 2 amino groups and preferably on each amino group of the melamine, R having the abovementioned meaning and in particular being hydrogen or methyl. Particular preference is given to melamine compounds exhibiting 2 to 6 and in particular 3 to 5 groups of the formula $CH_2OR$, in which R can be identical or different and is hydrogen or $C_1$-$C_4$-alkyl and especially hydrogen or methyl. Such compounds can be obtained by reaction of melamine with 2 to 6 and in particular 3 to 5 mol of formaldehyde per mole of melamine (R=H) and, if appropriate, with 2 to 6, in particular 3 to 5, mol of $C_1$-$C_4$-alkanols per mole of melamine (R=$C_1$-$C_4$-alkyl), in particular with $C_1$-$C_2$-alkanols, such as methanol.

Suitable crosslinkable nitrogen compounds for use in stage a) of the process according to the invention are in particular also α) low molecular weight compounds $V^y$ which exhibit an N-bonded group of the formula $CH_2OR$, in which R is $C_1$-$C_4$-alkyl or in particular hydrogen, and, if appropriate, a 1,2-bishydroxyethane-1,2-diyl group bridging two nitrogen atoms, and γ) reaction products or mixtures of the compound $V^y$ with at least one alcohol chosen from $C_1$-$C_6$-alkanols, $C_2$-$C_6$-polyols and oligoalkylene glycols.

Preferred compounds $V^y$ are urea and urea derivatives carrying a group of the formula $CH_2OR$ on a nitrogen atom of the urea unit (also compounds $V^{y1}$ below), R having the abovementioned meaning and in particular being hydrogen. Examples of preferred compounds $V^y$ are in particular 1-hydroxymethyl-4,5-dihydroxyimidazolidin-2-one, 1-hydroxymethylurea, 1-hydroxymethylimidazolidin-2-one and 1-hydroxymethyl-3-methyl-4,5-dihydroxyimidazolidin-2-one and especially 1-hydroxymethyl-4,5-dihydroxyimidazolidin-2-one. The compounds $V^y$ can also be used as mixtures with the compounds $V^x$, the precondensates thereof β and the reaction products thereof γ.

Mixtures of the compounds of the groups α), β) and/or γ) with one another are also suitable as crosslinkable nitrogen compounds. These include in particular mixtures of urea derivatives $V^{x1}$ and/or $V^{y1}$ as mentioned above, carrying a group of the formula $CH_2OR$ on one or both nitrogen atom(s) of the urea unit, with melamine compounds carrying at least one group of the formula $CH_2OR$ on average on at least 2 amino groups and preferably on each amino group of the melamine. These in particular also include mixtures of urea derivatives $V^{x1}$ with compounds $V^y$, in particular with urea derivatives $V^{y1}$, carrying a group of the formula $CH_2OR$ on one of the two nitrogen atoms of the urea unit. In these mixtures, the mass ratio of compound $V^{x1}$ or the precondensate of $V^{x1}$ or the reaction product of $V^{x1}$ to the compound $V^y$ is generally chosen in such a way that the weight ratio ranges from 9:1 to 1:9, in particular from 4:1 to 1:4 and especially from 1:2 to 2:1.

Mixtures of at least one compound chosen from the groups α), β) and/or γ) and in particular from the group V and especially from the groups $V^x$ and $V^y$ with at least one nitrogen compound which is not crosslinkable per se are also suitable as crosslinkable nitrogen compounds. These include compounds V' exhibiting at least one free NH group and compounds V" exhibiting at least one OH group not present in the form of a $CH_2OH$ group. In these mixtures, the preferences with regard to the groups α), β) and γ) are as stated above.

In the compounds V', the NH group is a constituent of an amide group and in particular of a urea group. Accordingly, preferred compounds V' are amides and in particular urea derivatives which can, if appropriate, carry a group of the formula $CH_2OR$ or a $C_1$-$C_4$-alkyl radical on one of the two nitrogen atoms, R having the above-mentioned meanings.

Examples of preferred compounds V' are urea compounds, such as urea, N-methylurea, ethylene urea (imidazolin-2-one), propylene urea, 4,5-bishydroxyimidazolin-2-one, N-methyl-4,5-bishydroxyimidazolin-2-one or N-methylimidazolin-2-one, and amides, such as acetamide, propionamide, butyramide, pyrrolidone, piperidin-2-one, caprolactam and the like.

Examples of preferred mixtures of this type are mixtures of
a) at least one crosslinkable nitrogen compound chosen from a1) melamine compounds carrying at least one group of the formula $CH_2OR$ on average on at least 2 amino groups and preferably on each amino group of the melamine, R having the abovementioned meaning and in particular being hydrogen or methyl, a2) urea derivatives $V^{x1}$ and a3) urea derivatives $V^{y1}$; with
b) at least one compound V' chosen from urea, N-methylurea, ethylene urea (imidazolin-2-one), propylene urea, 4,5-bishydroxyimidazolin-2-one and N-methyl-4,5-bishydroxyimidazolin-2-one.

In the mixtures of the at least one crosslinkable nitrogen compound (in particular a compound V) with the at least one compound V', the mass ratio of compound V or the precondensate of V or the reaction product of V to the compound V' is generally chosen in such a way that the molar ratio of the $CH_2OR$ groups to the free NH groups is at least 1.1:1 and in particular at least 2:1, i.e. the $CH_2OR$ groups are present in excess. The molar ratio preferably ranges from 1000:1 to 2:1, in particular from 500:1 to 3:1, particularly preferably from 300:1 to 5:1 and especially from 200:1 to 10:1. The use of mixtures comprising at least one compound V'" results in an additional reduction in the value for the formaldehyde emission with a fixing of the nitrogen compound in the lignocellulose material which is only slightly poorer or not poorer at all.

In the compounds V'", the OH group is preferably a constituent of a hemiaminal group, the nitrogen atom for its part being in particular a constituent of an amide group or of a urea group. Accordingly, preferred compounds V'" are amides and in particular urea derivatives carrying, on at least one of the nitrogen atoms of the amide or of the urea group, a secondary or tertiary carbon atom for its part carrying an OH group.

Examples of preferred compounds V'" are 4,5-bishydroxyimidazolin-2-one, N-methyl-4,5-bishydroxyimidazolin-2-one, 1,3-dimethyl-4,5-bishydroxyimidazolin-2-one and the like.

Examples of preferred mixtures of this type are mixtures of
a) at least one crosslinkable nitrogen compound chosen from a1) melamine compounds carrying at least one group of the formula $CH_2OR$ on average on at least 2 amino groups and preferably on each amino group of the melamine, R having the abovementioned meaning and in particular being hydrogen or methyl, a2) urea derivatives $V^{x1}$ and a3) urea derivatives $V^{y1}$; with
b) at least one compound V'" chosen from 4,5-bishydroxyimidazolin-2-one, N-methyl-4,5-bishydroxyimidazolin-2-one and 1,3-dimethyl-4,5-bishydroxyimidazolin-2-one.

In the mixtures of the at least one crosslinkable nitrogen compound (in particular a compound V) with the at least one compound V'", the mass ratio of compound V or the precondensate of V or the reaction product of V to the compound V'" is generally chosen in such a way that the weight ratio ranges from 9:1 to 1:9, in particular from 4:1 to 1:4 and especially from 1:2 to 2:1. The use of mixtures comprising at least one compound V'" results in an additional reduction in the value for the formaldehyde emission with a fixing of the nitrogen compound in the lignocellulose material which is only slightly poorer or not poorer at all. In particular, the swelling/shrinking behavior is not disadvantageously affected.

Mixtures comprising, in addition to the crosslinkable nitrogen compound, both at least a compound V' and a compound V'" are furthermore advantageous. With regard to the preferences for the crosslinkable nitrogen compounds V and for the compounds V' and V'", that stated above is analogously applicable. In these mixtures, the mass ratio of compound V or the precondensate of V or the reaction product of V to the total amount of compound V' and V'" is generally chosen in such a way that the weight ratio ranges from 9:1 to 1:9, in particular from 4:1 to 1:4 and especially from 1:2 to 2:1.

Aqueous compositions of compounds V, their precondensates and their reaction products are known per se, for example from WO 2004/033171, WO 2004/033170, K. Fisher et al., "Textile Auxiliaries—Finishing Agents," Chapter 7.2.2, in Ullmann's Encyclopedia of Industrial Chemistry, 5th ed. on CD-ROM, Wiley-VCH, Weinheim, 1997, and the literature cited therein, U.S. Pat. No. 2,731,364, U.S. Pat. No. 2,930,715, H. Diem et al., "Amino-Resins", Chapter 7.2.1 and 7.2.2 in Ullmann's Encyclopedia of Industrial Chemistry, 5th ed. on CD-ROM, Wiley-VCH, Weinheim, 1997, and the literature cited therein, Houben-Weyl E20/3, pp. 1811-1890, and are conventionally used as crosslinking agents for textile finishing. Reaction products of N-methylolated urea compounds V with alcohols, e.g. modified 1,3-bis(hydroxymethyl)-4,5-dihydroxy-imidazolidin-2-one (mDMDHEU), are known, for example from U.S. Pat. No. 4,396,391 and WO 98/29393. Otherwise, compounds V and their reaction products and precondensates are commercially available, for example under the trade names Fixapret® CP and Fixapret® ECO from BASF Aktiengesellschaft and the Kauramine® trade marks (e.g. Kauramin 650 Powder) and the Luwipal® trade marks from BASF. Mixtures of at least one compound chosen from compounds V, their precondensates or their reaction products with at least one compound V' and/or V'" can be prepared, for example, by incorporation of a compound V' or V'" in a commercial aqueous composition of the compound V, of a precondensate of V or of a reaction product of V.

In one embodiment of the invention, the crosslinkable nitrogen compound is chosen from a 1,3-bis(hydroxymethyl)-4,5-dihydroxyimidazolidin-2-one modified with a $C_1$-$C_6$-alkanol, a $C_2$-$C_6$-polyol and/or a polyalkylene glycol (mDMDHEU). Examples of polyalkylene glycols are in particular the oligo- and poly-$C_2$-$C_4$-alkylene glycols mentioned below. mDMDHEU relates to reaction products of 1,3-bis(hydroxymethyl)-4,5-dihydroxyimidazolidin-2-one with a $C_1$-$C_6$-alkanol, a $C_2$-$C_6$-polyol, an oligoethylene glycol or mixtures of these alcohols. Suitable $C_{1-6}$-alkanols are, for example, methanol, ethanol, n-propanol, isopropanol, n-butanol and n-pentanol; methanol is preferred. Suitable polyols are ethylene glycol, diethylene glycol, 1,2- and 1,3-propylene glycol, 1,2-, 1,3-, and 1,4-butylene glycol, and glycerol. Examples of suitable polyalkylene glycols are in particular the oligo- and poly-$C_2$-$C_4$-alkylene glycols mentioned below. For the preparation of mDMDHEU, DMDHEU is mixed with the alkanol, the polyol or the polyalkylene glycol. In this connection, the monovalent alcohol, the polyol, or the oligo- or polyalkylene glycol are generally used in a ratio of in each case 0.1 to 2.0, in particular 0.2 to 2, molar equivalents, based on DMDHEU. The mixture of DMDHEU, the polyol or the polyalkylene glycol is generally reacted in water at temperatures of preferably 20 to 70° C. and a pH value of preferably 1 to 2.5, the pH value being adjusted after the reaction generally to a range of 4 to 8.

In an additional embodiment of the invention, the crosslinkable nitrogen compound used in stage a) is chosen from at least 2-times, e.g. 2-, 3-, 4-, 5- or 6-times, in particular a 3-times, methylolated melamine(poly(hydroxymethyl) melamine) and a poly(hydroxymethyl)melamine modified with a $C_1$-$C_6$-alkanol, a $C_2$-$C_6$-polyol and/or a polyalkylene glycol. Examples of polyalkylene glycols are in particular the oligo- and poly-$C_2$-$C_4$-alkylene glycols mentioned below. The aqueous compositions normally used for the modifying can also comprise one or more of the abovementioned alcohols, e.g. $C_1$-$C_6$-alkanols, $C_2$-$C_6$-polyols, oligo- and polyalkylene glycols or mixtures of these alcohols. Suitable $C_{1-6}$-alkanols are, for example, methanol, ethanol, n-propanol, isopropanol, n-butanol and n-pentanol; methanol is preferred. Suitable polyols are ethylene glycol, diethylene glycol, 1,2- and 1,3-propylene glycol, 1,2-, 1,3-, and 1,4-butylene glycol, and glycerol. Suitable oligo- and polyalkylene glycols are in particular oligo- and poly-$C_2$-$C_4$-alkylene glycols, especially homo- and cooligomers of ethylene oxide and/or of propylene oxide, which can be obtained, if appropriate, in the presence of low molecular weight initiators, e.g. aliphatic or cycloaliphatic polyols with at least 2 OH groups, such as 1,3-propanediol, 1,3- and 1,4-butanediol, 1,5-pentane-diol, 1,6-hexanediol, glycerol, trimethylolethane, trimethylolpropane, erythritol and pentaerythritol, as well as pentitols and hexitols, such as ribitol, arabitol, xylitol, dulcitol, mannitol and sorbitol, and also inositol, or aliphatic or cycloaliphatic polyamines with at least 2 —$NH_2$ groups, such as diethylenetriamine, triethylenetetramine, tetraethylene-pentamine, 1,3-propylenediamine, dipropylenetriamine, 1,4,8-triazaoctane, 1,5,8,12-tetraazadodecane, hexamethylenediamine, dihexamethylenetriamine, 1,6-bis(3-aminopropylamino) hexane, N-methyldipropylenetriamine or polyethylenimine, preference being given, among these, to diethylene glycol, triethylene glycol, di-, tri- and tetrapropylene glycol and low molecular weight Pluronic® brands from BASF (e.g., Pluronic® PE 3100, PE 4300, PE 4400, RPE 1720, RPE 1740).

The concentration of the crosslinkable nitrogen compounds in the aqueous composition usually ranges from 10 to 60% by weight, frequently from 15 to 60% by weight and in particular from 20 to 50% by weight, based on the total weight of the composition. If the aqueous composition comprises one of the abovementioned alcohols, its concentration preferably ranges from 1 to 50% by weight, in particular from 5 to 40% by weight. The total amount of crosslinkable compound and alcohol usually comes to 15 to 60% by weight and in particular 20 to 50% by weight of the total weight of the aqueous composition.

The aqueous composition used in stage a) for the modifying comprises at least one catalyst K which brings about the crosslinking of the nitrogen compound. Metal salts from the group of the metal halides, metal sulfates, metal nitrates, metal phosphates and metal tetrafluoroborates; boron trifluoride; ammonium salts from the group of the ammonium halides, ammonium sulfate, ammonium oxalate and diammonium phosphate; organic carboxylic acids, organic sulfonic acids; inorganic Brönsted acids, such as boric acid, phosphoric acid, sulfuric acid and hydrochloric acid, are generally suitable as catalysts K.

Examples of metal salts suitable as catalysts K are in particular magnesium chloride, magnesium sulfate, zinc chloride, lithium chloride, lithium bromide, aluminum chloride, aluminum sulfate, zinc nitrate and sodium tetrafluoroborate.

Examples of ammonium salts suitable as catalysts K are in particular ammonium chloride, ammonium sulfate, ammonium oxalate and diammonium phosphate.

Water-soluble organic carboxylic acids, such as maleic acid, formic acid, citric acid, tartaric acid and oxalic acid, furthermore benzenesulfonic acids, such as p-toluenesulfonic acid, but also inorganic acids, such as hydrochloric acid, phosphoric acid, sulfuric acid, boric acid or their mixtures, are also suitable in particular as catalysts K.

The catalyst K is preferably chosen from magnesium chloride, zinc chloride, magnesium sulfate, aluminum sulfate or their mixtures, magnesium chloride being particularly preferred.

In a specific embodiment for the preparation of low-chloride lignocellulose materials, use is made of a catalyst comprising no chlorides.

The catalyst K will usually be added to the aqueous composition only shortly before the modifying process. It is generally used in an amount of 1 to 20% by weight, in particular 2 to 10% by weight, based on the total weight of the curable constituents present in the aqueous composition. The concentration of the catalyst, based on the total weight of the aqueous dispersion, generally ranges from 0.1 to 10% by weight and in particular from 0.5 to 5% by weight.

In addition, the composition used for modifying the wood can comprise one or more effect substances, for example a colorant, e.g. a dye or a pigment, a UV stabilizer, an antioxidant, a fungicide and/or insecticide, and the like, as disclosed in PCT/EP2006/004019 (prior German patent application 102005020386.8), to the content of which reference is made herewith. The concentration of effect substance ranges, depending on the effect substance, from 0.01 to 60% by weight and in particular 0.1 to 25% by weight, based on the weight of the composition.

In addition, the composition used for the impregnating of the lignocellulose material in stage a) can comprise one or more hydrophobic constituents, for example at least one wax or one oil in emulsified or suspended form, as disclosed in PCT/EP2006/004014 and PCT/EP2006/004016 (prior German patent applications DE 102005020389.2 and DE 102005020390.6), to the content of which reference is made herewith. The concentration of hydrophobic constituent typically ranges from 0.01 to 60% by weight and in particular 0.1 to 25% by weight, based on the weight of the composition.

The impregnation can be carried out in a way conventional per se, e.g. by immersion, by application of vacuum, if appropriate in combination with elevated pressure, or by conventional application methods, such as spreading, spraying and the like. The impregnation method used in each case naturally depends on the dimensions of the material to be impregnated. Lignocellulose materials having small dimensions, such as shavings or strands, and also thin veneers, i.e. materials with a high ratio of surface area to volume, can be impregnated cheaply, e.g. by immersion or spraying, whereas lignocellulose materials having larger dimensions, in particular materials having a smallest extent of more than 5 mm, e.g. solid wood or moldings made of solid wood, are impregnated by application of pressure or vacuum, in particular by combined application of elevated pressure and vacuum. The impregnation is advantageously carried out at a temperature of less than 50° C., e.g. in the range from 15 to 50° C.

The conditions of the impregnation are generally chosen so that the amount of curable constituents from the aqueous composition taken up corresponds to the desired nitrogen content. Generally, the amount of curable constituents taken up is at least 5% by weight, based on the dry weight of the untreated material. The amount of curable constituents taken up can be up to 100% by weight, based on the dry weight of the untreated materials, and frequently ranges from 5 to 60% by weight, preferably ranges from 10 to 50% by weight, based on the dry weight of the untreated material used. The moisture content of the untreated materials used for the impregnation depends on the dimensions of the lignocellulose material and can, for example, be up to 100% for materials which are small in size, such as veneers and finely divided materials. The moisture content is preferably less than the fiber saturation of the lignocellulose material. It frequently (in particular with larger-size materials, such as solid wood) ranges from 1 to 50% and in particular 5 to 30%. Here and subsequently, the term "moisture content" is synonymous with the term "residual moisture content" according to DIN 52183.

For immersion, the lignocellulose material, if appropriate after predrying, is immersed in a container comprising the aqueous composition. The immersion is preferably carried out over a period of time from a few seconds to 24 h, in particular 1 min to 6 h. The temperatures usually range from 15° C. to 50° C. Doing this, the lignocellulose material takes up the aqueous composition, it being possible for the amount of the non-aqueous constituents (i.e., curable constituents) taken up by the wood material to be controlled by the concentration of these constituents in the aqueous composition, by the temperature and by the duration of treatment. The amount of constituents actually taken up can be determined and controlled by a person skilled in the art in a simple way via the increase in weight of the impregnated material and the concentration of the constituents in the aqueous composition. Veneers can, for example, be prepressed using press rolls, i.e. calenders, which are present in the aqueous impregnation composition. The vacuum occurring in the wood on relaxation then results in an accelerated uptake of aqueous impregnation composition.

The impregnation is advantageously carried out by combined application of reduced and increased pressure. For this, the lignocellulose material, which generally exhibits a moisture content in the range from 1% to 100%, is first brought into contact with the aqueous composition, e.g. by immersion in the aqueous composition, under a reduced pressure which is frequently in the range from 10 to 500 mbar and in particular in the range from 40 to 100 mbar. The duration is usually in the range from 1 min to 5 h. This is followed by a phase at increased pressure, e.g. in the range from 2 to 20 bar, in particular from 4 to 15 bar and especially from 5 to 12 bar. The duration of this phase is usually in the range from 1 min to 12 h. The temperatures are usually in the range from 15 to 50° C. Doing this, the lignocellulose material takes up the aqueous composition, it being possible for the amount of the non-aqueous constituents (i.e., curable constituents) taken up by the wood material to be controlled by the concentration of these constituents in the aqueous composition, by the pressure, by the temperature and by the duration of treatment. The amount actually taken up can also here be calculated via the increase in weight of the lignocellulose material.

Furthermore, the impregnation can be carried out by conventional methods for applying liquids to surfaces, e.g. by spraying or rolling or spreading. With regard to this, use is advantageously made of a material with a moisture content of not more than 50%, in particular not more than 30%, e.g. in the range from 12% to 30%. The application is usually carried out at temperatures in the range from 15 to 50° C. The spraying can be carried out in the usual way in all devices suitable for the spraying of flat or finely divided bodies, e.g. using nozzle arrangements and the like. For spreading or rolling, the desired amount of aqueous composition is applied to the flat material with rolls or brushes.

It is possible, before the treatment of the lignocellulose material in stage b), to mechanically free the impregnated lignocellulose material obtained in stage a) from adhering liquid.

The treatment in process stage b) of the impregnated lignocellulose material obtained in process stage a) comprises, according to the invention, treatment with superheated steam, also referred to subsequently as dry steam. These terms are understood to mean steam having a temperature greater, preferably at least 5 K and in particular at least 10 K greater, than the saturation temperature of the steam at the pressure present each time.

The aqueous liquid used to generate the superheated steam can, in addition to water, also comprise water-miscible organic liquids. The proportion of organic liquids will generally not make up more than 10% by volume. Suitable water-miscible liquids are alcohols, such as $C_1$-$C_8$-alkanols, e.g. ethanol, n-propanol, isopropanol, n-butanol, and the like. Water is preferably used for the production of superheated steam.

Use is generally made, for the treatment with superheated steam, of a device comprising the following units:
  steam generator,
  heat exchanger,
  treatment chamber,
  if appropriate, unit for the posttreatment of the steam emerging from the treatment chamber in order to reduce loading with organic materials.

Superheated steam can be generated in steam generators with heat exchangers known for this purpose. In addition, wet steam, i.e. saturated steam, can be introduced into the treatment chamber and the wet steam can be superheated, i.e. converted to superheated steam, using heat exchangers installed in the treatment chamber. On integrated chemical sites with crude oil refining, superheated steam is available from other processes, such as the FCC process, methanol manufacture, and the like.

All containers which make it possible to effectively bring the lignocellulose material into contact with the superheated steam, which prevent uncontrolled escape of the steam and which allow controlled removal of steam are suitable in principle as treatment chambers. In this connection, they are generally closed vessels which have a supply pipe for the steam and a device for controlled pressure compensation. These include all containers known to a person skilled in the art for the drying of wood using superheated steam. For the treatment of finely divided lignocellulose materials, such as fibers, shavings, strands, chips, parings and the like, the treatment chambers may exhibit devices which make possible thorough mechanical mixing of the lignocellulose material. These include, e.g., tubular chambers which can be rotated. Treatment chambers for flat and large-size lignocellulose materials, such as veneers or parts made of solid wood, can be provided with internal fittings which make possible a low- or zero-contact arrangement of the materials in the chamber. The chambers can also exhibit devices which make possible fixing of large-size lignocellulose articles without distortion.

In addition, the chamber can also exhibit devices for regulating the pressure or temperature and devices for monitoring the pressure or temperature in the chamber and/or the wet-bulb temperature of the steam or the moisture content of the lignocellulose material.

The superheated steam used for the treatment generally exhibits a temperature of greater than 100° C., frequently of at least 105° C. and in particular of at least 110° C. The temperature will generally not exceed 200° C., in particular 180° C. and particularly preferably 150° C.

During the treatment with superheated steam, the temperature in the chamber will generally lie in the ranges given for the temperature of the superheated steam.

Preferably, during the treatment, a wet-bulb temperature will be maintained which corresponds to the boiling point of the liquid at ambient pressure, thus approximately 100° C.

In a preferred embodiment, the superheated steam is generated in situ inside the treatment chamber. For this, the lignocellulose material is first charged to the chamber and subsequently, during a heating-up phase, the chamber is filled with non-superheated steam (wet steam). For this, as the chamber is being heated up, the relative air humidity is kept constant at approximately 100%. After reaching a temperature of approximately 100° C., the steam is further heated by supplying additional heat energy, thus producing superheated steam. Under these conditions, water still present in the lignocellulose material is converted to the gaseous state and, in addition to the curing/crosslinking, the moisture is simultaneously transported from the inside of the wood to the surface of the wood as a result of the pressure difference from the chamber. Consequently, the drying process can generally even be shortened in comparison with a conventional drying.

The speed of the curing/crosslinking and the speed of the drying are determined by the energy supplied to the lignocellulose material. This energy supply is determined, inter alia, by the difference between the temperature of the lignocellulose material to be treated and the temperature of the superheated steam. Such a temperature difference always appears as long as the lignocellulose material still comprises water which is not evaporated yet. During the drying phase, the optimum drying speed can accordingly be adjusted via the temperature of the superheated steam.

The superheated steam used for the treatment preferably exhibits a pressure in the range from 0.9 to 5 bar and will in particular not exceed a pressure of 3 bar and particularly preferably 2 bar.

The duration of the treatment with superheated steam in stage b) (with repeated treatment with superheated steam, the total duration) preferably ranges from 1 min to 200 hours, particularly preferably from 5 min to 48 hours. With veneers and finely divided lignocellulose materials, higher temperatures and shorter times can rather be used.

Preferably, the treatment with superheated steam is carried out for so long until the residual moisture in the lignocellulose material is not more than 10%, in particular not more than 8% and especially not more than 7%, e.g. 2 to 10%, in particular 3 to 8% and especially approximately 4 to 7%. The residual moisture can be determined conventionally via conductivity measurements.

The use of superheated steam exhibits the following advantages in comparison with conventional processes:
- the lignocellulose materials obtained are characterized by high degrees of fixing,
- superheated steam makes possible high energy yields in the crosslinking/drying of the lignocellulose material which can be further increased by use of an integrated energy system with additional energy-consuming stages of the process according to the invention (e.g., heating of the fresh water in a heat exchanger before the actual generation of the superheated steam or an additional drying) or other processes,
- closed drying circuits make possible effective treatment of waste gas and a reduction in environmental damage.

The treatment in process stage b) of the impregnated lignocellulose material obtained in process stage a) furthermore comprises at least one treatment at low humidity of the surrounding gas volume (=drying treatment) which follows the treatment with superheated steam.

The temperature in the drying treatment is frequently greater than 120° C., preferably greater than 130° C., e.g. in the range from >120° C. to 200° C. and in particular in the range from 130° C. to 160° C. The use of a temperature gradient, e.g. through the imposition of a temperature profile which can extend from 120° C. to 200° C., in particular from 130 to 160° C., is also suitable. This drying treatment serves to support the drying and/or curing. Surprisingly, it has been found that, by the combination according to the invention of treatment with superheated steam and drying treatment, lignocellulose materials with low formaldehyde emissions according to the invention are obtained, even with high levels of nitrogen charge.

The drying treatment is preferably carried out by bringing the lignocellulose material into contact with a gaseous medium exhibiting a relative humidity of at most 15%, particularly preferably of at most 5%. The lignocellulose material is preferably brought into contact with a gaseous medium chosen from air, inert gases, such as nitrogen, helium, neon, argon, and the like, and mixtures thereof. Use is particularly preferably made of air.

The duration of the drying treatment is generally chosen so that the residual moisture in the lignocellulose material after the end of the drying treatment is less than 8%, e.g. 1 to 8%, in particular not more than 6%, e.g. 1 to 6%, and especially not more than 5%, e.g. 1 to 5%. It typically ranges from 1 min up to 24 hours, particularly preferably 5 min up to 12 hours.

The drying treatment is carried out according to the invention subsequent to the treatment with superheated steam. According to a first embodiment, for this, a treatment with superheated steam is first carried out in the way described above, until the desired residual moisture content is achieved, and subsequently a drying treatment as described above is carried out. In an additional embodiment, the drying treatment is carried out intermittently with the treatment with superheated steam. For this, the lignocellulose material can be alternately (in a pulsed fashion) subjected to treatment with superheated steam and with a gaseous medium with a low relative humidity, as described above. This alternation between superheated steam and gaseous medium differing therefrom can be carried out, e.g., using a conventional fresh air-outgoing air system.

In addition, in stage b), a predrying can be carried out before the treatment with superheated steam. The term "predrying" means that the lignocellulose material is dried to below the fiber saturation point, which, depending on the type of the material, can vary somewhat and is typically approximately 30% by weight. In this connection, the impregnated lignocellulose materials are freed, at least partially, from volatile constituents of the aqueous composition used in stage a), in particular from water and/or excess organic solvents, which do not react in the curing/crosslinking. Moreover, the predrying counteracts the danger of cracking. The predrying can be omitted, in particular for small-scale materials and articles, for example veneers. For lignocellulose bodies with relatively large sizes, a predrying may, however, be advantageous. If a separate predrying is carried out, this is advantageously carried out at temperatures ranging from 20 to 80° C. Depending on the temperature chosen, partial or complete curing/crosslinking of the curable constituents present in the composition may already occur in the treatment before the treatment with superheated steam. It is preferable for no or only partial curing/crosslinking to occur before the treatment with superheated steam. The pretreatment is preferably carried out in a way that the moisture content of the lignocellulose materials after the pretreatment is not more than 30%, in particular not more than 20%, based on the dry weight. The moisture content can be controlled in a simple way by the pressure chosen in the predrying, the temperature and the duration and can be determined conventionally via conductivity measurements.

The predrying of the lignocellulose material can be carried out in a conventional fresh air-outgoing air system, e.g. a rotary drier.

Predrying and/or drying treatment of the lignocellulose material are preferably carried out in the same device as the treatment with superheated steam.

The lignocellulose materials can, subsequent to the impregnation in stage a) and during or subsequent to stage b), be subjected to further processing. In the case of finely divided materials, it is possible to carry out, e.g., further processing to give moldings, such as OSB (oriented structural board) boards, particle boards, wafer boards, OSL (oriented strand lumber) boards and OSL moldings, PSL (parallel strand lumber) boards and PSL moldings, boards and moldings made of constructed strand lumber, SCL (structural composite lumber) moldings and SCL boards, LSL (laminated strand lumber) moldings and LSL boards, insulating boards and medium-density (MDF) and high-density (HDF) fiber boards, and the like, and, in the case of veneers, to give veneer lumber, such as veneered fiber boards, veneered blackboards, veneered particle boards, including veneered OSB, SCL, OSL and PSL boards, plywood, glued wood, laminated wood, veneered laminated wood (e.g. Kerto laminated wood), multiplex boards, and laminated veneer lumber (LVL), but also nonplanar 3-dimensionally shaped components, such as laminated wood moldings, plywood moldings and any other moldings laminated with at least one layer of veneer. The further processing can be carried out immediately after the impregnation in stage a) or during or subsequent to stage b). For veneers and wood-base materials, the further processing comprises, in addition to the curing and adhesive bonding or shaping, also an adhesive bonding stage. Reference may be made, for details of these, to the content of PCT/EP2006/001980 (prior German patent application 102005010041.4) (veneer lumber) and the content of PCT/EP2006/001979 (prior German patent application 102005010042.2) (wood-base material). In the case of impregnated veneers, the further processing will advantageously be carried out before the curing stage or together with the curing stage. With wood-base materials made of finely divided materials, the shaping stage and the curing stage are frequently carried out simultaneously.

The use of modified lignocellulose materials obtained according to the process according to the invention, especially of wood materials modified in such a way, makes possible the manufacture of objects with improved mechanical strength and improved weathering resistance, in particular reduced crack formation in those regions which are manufactured from the wood material, and reduced susceptibility of these regions to infection by wood-damaging organisms, such as wood-destroying fungi.

The lignocellulose materials according to the invention and obtainable according to the process according to the invention and the objects prepared therefrom can exhibit a conventional coating, for example a varnish, a glaze or a stain, as disclosed in PCT/EP2006/004020 (prior German patent application DE 102005020387.6), to the content of which reference is made herewith.

The modified wood materials are suitable in particular for the manufacture of objects manufactured from several parts connected with each other, in which at least one part is manufactured from a modified wood material, since, because of the reduced swelling/shrinking ratio of the modified wood, the joints between the various parts are more stable and, under the influence of the weather, are subject to reduced mechanical stresses and their function can be better maintained. This is then valid in particular if the parts manufactured from the modified wood material are at least partially friction-locked to each other or to parts made of other materials. Due to the reduced tendency towards swelling/shrinking of the wood materials according to the invention, it is possible furthermore for the first time to manufacture weather-resistant wooden objects in which several types of wood with different swelling/shrinking behavior are connected with one another through an integral joint, e.g. adhesive bonding or a frictional joint, including a nonfrictional joint with frictional component, e.g. are connected with one another through a nailed or screwed joint, through dowels, through indented joints, including dovetail joints, through tenoned joints, through grooved and tongued joints, or through other mechanical joints, since an equalizing of the swelling/shrinking behavior is achieved by the treatment according to the invention.

The modified wood material is in particular solid wood, i.e. large-size materials with sizes in the centimeter or meter range, e.g. planks, logs, round timber, beams or the like.

As already explained above, modified wood materials according to the invention are suitable in particular for the manufacture of objects comprising several parts connected with each other, in which at least one part is manufactured from a modified wood material. They are suitable in particular for the manufacture of objects in which at least two parts of the object are friction-locked, at least one part of the friction-locked parts being manufactured from a modified wood material.

Because of its insensitivity with regard to effects of moisture, the invention also relates in particular to the use of modified wood materials for the manufacture of objects which are subject to moisture or weathering conditions. The effect of moisture can be contact with high air humidity, e.g. if the objects are found in locations subjected to moisture, such as bathrooms, indoor swimming pools, saunas, laundries, the inside of ships, and the like, or, however, also if they are subjected to high air humidity outdoors. The contact with moisture can also be contact with liquid water or with standing moisture, e.g. by the action of rain, by contact with river or sea water, with hydraulic engineering edifices or with ships.

The objects can be manufactured in a way known per se by analogy to the manufacture of objects made of wood materials. The manufacture comprises typical wood processing actions, such as sawing, cutting, planing, milling, grinding, drilling, screwing, nailing, adhesive bonding, laminating and the like. Generally, the starting material for the manufacture of the objects is the wood material which has already been modified. However, it is also possible first to manufacture the object from an unmodified wood material and subsequently to subject the wooden constituents to a modification as described above.

In a first embodiment of the invention, the modified wood material is used for the manufacture of flooring materials. Use is frequently made for this of veneer lumber in which the decorative surface exposed to the weather is made of a modified veneered laminated wood-layer according to the invention. An example of this is parquet flooring, including strip parquet, solid wood parquet, mosaic parquet, industrial parquet, ready-to-lay parquet, e.g. 2-layer or 3-layer ready-to-lay parquet, veneered floors and sports floors, e.g. area-elastic sports floors and point-elastic sports floors, and also sprung parquet floors. Modified wood materials according to the invention are also suitable for the manufacture of plank parquet, terrace floorings, and the like. Wood materials according to the invention are also suitable for the manufacture of laminate, in which the modified wood material according to the invention in this connection generally forms the densified wood layer of the laminate.

An additionally preferred embodiment of the invention relates to a wooden object, in particular a flooring material, which consists of at least two pieces of wood connected with one another, in particular adhesively bonded pieces of wood, it being possible for the pieces of wood to be identical or different. A specific embodiment of the invention relates to a flooring material for use outdoors and use exposed to moisture. Conventional flooring materials for use outdoors and use exposed to moisture are typically boards, including floorboards, and planks manufactured from hardwood which are frequently still provided with a surface structuring. These floorings are generally very expensive because of the high price of the hardwoods. The weather or moisture resistance is not always satisfactory. The wood materials according to the invention now allow the preparation of floorings with high durability even from inexpensive woods, such as pine, spruce, beech, poplar and the like. In particular, the wood materials according to the invention allow the preparation of flooring materials which exhibit a backing made from a first wood material according to the invention and a surface layer or wearing surface made from a second wood material which is connected, in particular by adhesive bonding, with the support. The material of the backing is preferably a wood material according to the invention made from an inexpensive type of wood, in particular an inexpensive solid wood, for example a pinewood treated according to the invention. Preferably, the wood material of the wearing surface is likewise a wood material according to the invention, preferably a wood material according to the invention with a decorative appearance, for example beech treated according to the invention. However, the wearing surface can also consist of an untreated hardwood or a hardwood treated according to the invention, for example of hardwood of the durability categories 1 or 1, such as angelim, bangkirai, ekki, bilinga, cumaru, Douglas fir, eucalyptus, fava, garapa, ipe, iroko, itauba, jatoba, karri, limbali, massaranduba, mukulungu, okan, piquia, robinia, tali, tatajuba, torrado or teak. The wearing surface typically exhibits a strength (thickness) of at least 1 mm, e.g. 1 to 10 mm, in particular 2 to 8 mm. The wearing surface can exhibit a profiling, e.g. a grooved profile. The strength of the backing naturally depends on the use desired and on the strength necessary for this. It typically ranges from 5 to 100 mm, in particular from 10 to 50 mm. The floorings can have the forms of boards, panelboards, floorboards, planks or gratings. The floorings can exhibit means for connecting the individual elements of the flooring, for example grooved and tongued joints, click joints and the like. Such floorings are typically prepared by adhesively bonding the backing to the wearing surface analogously to known processes for the adhesive bonding of wood layers, for example analogously to processes for the preparation of laminated wood or for the preparation of floorings for use indoors, which exhibit a backing and a wearing surface arranged thereon. In particular, the preparation can be carried out analogously to the process described in PCT/EP2006/001980, wood materials treated according to the invention being adhesively bonded with one another in a different fashion from the process described therein.

In an additional embodiment of the invention, the modified wood material is used for the manufacture of doors and doorframes, for example for interior doors but also for house doors. The modified wood material can be used both for the door leaf itself and for parts of the door leaf, e.g. in the form of solid wood boards or wood-base material boards for the interior construction of the door leaf or in the form of a veneer for the decorative layer on the door leaf.

In an additional embodiment of the invention, the modified wood material is used for the manufacture of windows, e.g. of window frames and/or sides of windows. The window frames and sides of windows can be manufactured from the same wood but also from different types of wood. It is likewise possible to manufacture the frame from a material other than wood and to manufacture only the sides of windows from a wood material modified according to the invention. The wood materials modified according to the invention can also be used for the manufacture of windowsills.

In an additional embodiment of the invention, the modified wood material is used for the manufacture of furniture, in particular of that furniture or those furniture parts which are typically manufactured from wood or wood materials. These include closets or parts of closets, such as the body, the doors or the floors, shelves, bedsteads, slatted frames, sofa frames, chairs, tables or parts of these items of furniture, such as table bases, table tops, worktops, in particular kitchen worktops, bathroom furniture, and the like. The modified wood materials according to the invention are suitable in particular for furniture which is subjected to a greater extent to moisture or the weather, e.g. for the manufacture of kitchen furniture or bathroom furniture or for the manufacture of garden furniture, park benches, stadium seats, and the like.

In an additional embodiment of the invention, the modified wood material is used for the manufacture of objects for hydraulic engineering, e.g. for bank reinforcements, hydraulic engineering structures, such as locks, in particular lock gates, waterwheels, platforms, pontoons, landing stages and other constructions in and on water.

In an additional embodiment of the invention, the modified wood material is used for the construction of buildings or parts of buildings. This includes, in addition to the construction of windows already mentioned, in particular the use of modified wood materials in the form of construction timber for the construction of wooden houses, for framework construction, for the construction of roof constructions, for the construction of buildings of post and beam construction, for the construction of bridges, viewing platforms or carports, and for parts of buildings, such as patios, balconies, balcony railings, dormer windows, and the like. This includes in addition the use of modified wood materials for the construction of staircases, including steps, e.g. in wooden steps in metal staircase constructions but also for staircases and banisters manufactured completely from wood materials.

In an additional embodiment of the invention, the modified wood material is used for façade construction. In this connection, the modified wood material can both be a constituent of the façade subconstruction and form the visible part of the façade, e.g. in the form of façade panels made of the modified wood material, façade boards made of modified wood, shingles made of modified wood, and the like.

In an additional embodiment of the invention, the modified wood material is used for the manufacture of wall components and ceiling components, for example panels, grooved and tongued boards, paneled wood ceilings, but also ceiling suspensions, movable walls or wall components in post and beam construction, ceiling linings and wall linings. Wood-base material based on finely divided materials in the form of boards are suitable in particular for this; for example, OSB boards, particle boards, OSL boards, PSL boards, insulating boards and medium-density (MDF) and high-density (HDF) fiber boards, and the like, and also veneer lumber, such as veneered fiber boards, veneered blackboards, veneered particle boards, including veneered OSL and PSL boards, plywood, glued wood, laminated wood or veneered laminated wood (e.g. Kerto laminated wood), are suitable.

In an additional embodiment of the invention, the modified wood material is used for garden construction, for example for the manufacture of fences, palisades, sight screen components, summer houses, pergolas, aviaries, and the like.

In an additional embodiment of the invention, the modified wood material is used for the manufacture of items of play equipment for the outdoors, for example for climbing frames, swings, in particular swing supporting frameworks and swing seats, play areas with apparatuses for climbing, swinging and/or sliding, for supporting frameworks of ropeways, and the like.

In an additional embodiment of the invention, the modified wood material is used for the manufacture of household articles, for example for knife blocks, breadboxes, wooden bowls, bathroom equipment, such as bath tubs, brushes, and the like, furthermore for cutting boards, cooking utensils, such as cooking spoons, turners, rolling pins, salad servers, noodle forks, and the like.

In an additional embodiment of the invention, the modified wood material is used for the construction of boats, both for the construction of hulls, e.g. for the planking, for ribs and keel, for engine bearer, for standing rigging, such as masts, spars, and for superstructures, deck planking, and other external fixtures, such as gratings, cleats, ship's wheel, control panels, and the like, and for interior fittings of ships, e.g. for cupboard fittings, bunk fittings, cabin walls and doors, cowlings, companionways, ladders, and the like.

In an additional embodiment of the invention, the modified wood material is used for the construction of saunas, for example for walls, doors, benches, oven cladding, and the like.

In an additional embodiment of the invention, the modified wood material is used in the construction of vehicles, for example for the interior trim of the passenger compartment or of the luggage trunk, and engine compartment linings, and also insulation, for example of the engine compartment and of the luggage trunk, and also for instrument panels, wood decoration, and the like.

In an additional embodiment of the invention, the modified wood material is used for the manufacture of toys, such as building bricks, rolling balls, toy houses and toy arrangements, such as dollhouses, doll kitchens, and the like, toy cars, planes and ships, for the construction of models, such as the construction of model cars, aircraft and ships, items of play equipment, such as bats, racket frames, and the like.

In an additional embodiment of the invention, the modified wood material is used for the manufacture of musical instruments, in particular for the construction of stringed instruments, such as guitars, lutes, harps, violins, violas, cellos, double basses or parts thereof, such as bridges, resonance boxes, scrolls or pegs, furthermore for the construction of woodwind instruments, such as clarinets, oboes, bassoons, recorders, and the like, or for the construction of organs, especially for wooden pipes, and for the construction of pianos and grand pianos.

In an additional embodiment of the invention, the modified wood material is used for the manufacture of sports equipment, in particular that sports equipment which is typically manufactured from wood or wood materials, but also for sports equipment in which wood had not hitherto been used due to its lack of strength and hardness.

Mention may be made, by way of examples, of bats, such as hockey and ice hockey sticks, throwing equipment, such as javelins and discuses, oars and sculls, for the construction of sports rowboats, such as sculling boats, kayaks, single sculls, Canadian canoes or gigs, and the like.

In an additional embodiment of the invention, the modified wood material is used for the manufacture of housings, including housing parts, for machines, electrical appliances, and the like.

Due to the increased strength of the modified wood materials according to the invention, it is possible in many cases to achieve a saving in weight due to reduced material expenditure. Moreover, the objects are far less susceptible to the effects of the weather and the effect of moisture. Due to the high dimensional stability resulting from the low swelling and shrinking and the production tolerances which can accordingly be achieved, the modified wood material can also be used for the manufacture of objects in which hitherto wood could not be used.

The following examples serve to illustrate the invention. The degrees of fixing mentioned were determined according to the abovementioned method A, unless otherwise indicated.

COMPARATIVE EXAMPLE 1

A commercial aqueous composition of 1,3-bis(hydroxymethyl)-4,5-dihydroxy-imidazolidin-2-one (DMDHEU) was diluted with water to a concentration of 30% by weight and mixed with 15 g/kg of $MgCl_2.6H_2O$. The solution thus obtained was used as impregnating agent in the following experiment.

Cubes of pine sapwood with dimensions of 2.5 cm×2.5 cm×2.5 cm, which were dried absolutely, were introduced into an impregnating plant. The impregnating plant was subjected for 30 minutes to a vacuum of 40 mbar absolute. Subsequently, the impregnating agent was run into the impregnating plant while maintaining a vacuum of 50 mbar absolute. Subsequently, a pressure of 10 bar was applied for 2 hours. The pressure phase was ended and the remaining liquid was removed.

The pinewood cubes were then stored in a drying chamber, the temperature and air humidity of which can be controlled. The chamber was brought to 95° C. and a relative air humidity of ca. 100%. These humid conditions were maintained for 48 hours.

Subsequently, the pinewood cubes were dried at 40° C. for 72 h. The pinewood cubes thus obtained exhibited a nitrogen content N of 4.00 g/100 g of pinewood. The formaldehyde emission FA, determined using the bottle method according to EN 717, part 3, was 62.2 mg/100 g of pinewood. The ratio FA/N was correspondingly $15.5 \times 10^{-3}$. The degree of fixing was 24%.

COMPARATIVE EXAMPLE 2

Superheated Steam Treatment

Pinewood planks with dimensions of 250 cm×10 cm×3.5 cm, which were dried to a wood moisture content of ca. 12%, were introduced into an impregnating plant. The impregnating plant was subjected for 30 minutes to a vacuum of 40 mbar absolute. Subsequently, the impregnating agent from comparative example 1 was run into the impregnating plant while maintaining a vacuum of 50 mbar absolute. Subsequently, a pressure of 12 bar was applied for 2 hours. The pressure phase was ended and the remaining liquid was removed.

The pinewood planks were then stored in a drying chamber, the temperature and air humidity of which can be controlled, and set fast in such a way that warping was impossible. The chamber was brought to 100° C. while maintaining a relative air humidity of 100%. Subsequently, the chamber was closed and heated to a dry-bulb temperature of 120° C. while maintaining a wet-bulb temperature of 100° C. These conditions were maintained until a uniform wood moisture content of approximately 8% over the entire cross section of the wood was obtained. Subsequently, the superheated steam was withdrawn and replaced by fresh air, which reduced the chamber temperature to 80° C. The chamber temperature was then reduced to 50° C. and the relative air humidity was adjusted to 50% by spraying with water. These conditions were maintained for 6 to 10 h in order to condition the wood.

The pinewood planks thus obtained exhibited a nitrogen content N of 3.17 g/100 g of pinewood. The formaldehyde emission FA, determined using the bottle method according to EN 717, part 3, was 26.4 mg/100 g of pinewood. The ratio FA/N was correspondingly $8.33 \times 10^{-3}$. The degree of fixing was 73%.

EXAMPLE 1

Superheated Steam Treatment+Dry Heating, Pinewood

Pinewood planks with dimensions of 250 cm×10 cm×3.5 cm, which were dried to a wood moisture content of ca. 12%, were impregnated analogously to comparative example 2 with the impregnating agent from comparative example 1.

The pinewood planks were then stored in a drying chamber, the temperature and air humidity of which can be controlled, and set fast in such a way that warping was impossible. The chamber was brought to 100° C. while maintaining a relative air humidity of 100%. Subsequently, the chamber was closed and heated to a dry-bulb temperature of 120° C. while maintaining a wet-bulb temperature of 100° C. These conditions were maintained until a uniform wood moisture content of approximately 8% over the entire cross section of the wood was obtained. The chamber was then heated to a drying temperature of 130° C. with a heating rate of 5 K/h while maintaining a wet-bulb temperature of the steam of 100° C. These conditions were maintained until a uniform wood moisture content of approximately 6% over the entire cross section of the wood was obtained. Subsequently, the superheated steam was withdrawn and replaced by fresh air while maintaining a temperature of 130° C., which reduced the relative air humidity to less than 10%. These conditions were maintained until a uniform wood moisture content of approximately 4% over the entire cross section of the wood was obtained. Subsequently, the chamber temperature was lowered to 80° C. by blowing in fresh air. The chamber temperature was then reduced to 50° C. and the relative air humidity was adjusted to 50% by spraying with water. These conditions were maintained for 6 to 10 h in order to condition the wood.

The pinewood planks thus obtained exhibited a nitrogen content N of 3.17 g/100 g of pinewood. The formaldehyde emission FA, determined using the bottle method according to EN 717, part 3, was 12.8 mg/100 g of pinewood. The ratio FA/N was correspondingly $4.04 \times 10^{-3}$. The degree of fixing was 84% (or 96% according to DIN EN 84).

EXAMPLE 2

Superheated Steam Treatment+Dry Heating, Beechwood

Beechwood planks with dimensions of 50 cm×10 cm×3.5 cm, which were dried to a wood moisture content of ca. 12%, were impregnated analogously to comparative example 2 with the impregnating agent from comparative example 1 and subsequently were successively treated with superheated steam and heated under dry conditions according to the directions of example 1.

The beechwood planks thus obtained exhibited a nitrogen content N of 2.20 g/100 g of beechwood. The formaldehyde emission FA, determined using the bottle method according to EN 717, part 3, was 8.9 mg/100 g of beechwood. The ratio FA/N was correspondingly $4.05 \times 10^{-3}$. The degree of fixing was 81% (or 95% according to DIN EN 84).

EXAMPLE 3

Superheated Steam Treatment+Dry Heating, Beechwood

A commercial aqueous composition of 1,3-bis(hydroxymethyl)-4,5-dihydroxy-imidazolidin-2-one (DMDHEU) was diluted with water to a concentration of 50% by weight and mixed with 25 g/kg of $MgCl_2.6H_2O$. The solution thus obtained was used as impregnating agent in the following experiment.

Beechwood planks with dimensions of 50 cm×10 cm×3.5 cm, which were dried to a wood moisture content of ca. 12%, were impregnated analogously to comparative example 2 with the impregnating agent and subsequently were successively treated with superheated steam and heated under dry conditions according to the directions of example 1.

The beechwood planks thus obtained exhibited a nitrogen content N of 3.75 g/100 g of beechwood. The formaldehyde emission FA, determined using the bottle method according to EN 717, part 3, was 6.1 mg/100 g of beechwood. The ratio FA/N was correspondingly $1.63 \times 10^{-3}$. The degree of fixing was 86% (or 97% according to DIN EN 84).

EXAMPLE 4

A commercial aqueous composition of 1,3-bis(hydroxymethyl)-4,5-dihydroxy-imidazolidin-2-one (DMDHEU) was treated with urea and diluted with water so that the concentration of DMDHEU was 15% by weight and the concentration of urea was 7.5% by weight. The solution was mixed with 15 g/kg of $MgCl_2.6H_2O$. The solution thus obtained was used as impregnating agent in the following experiment.

Pinewood planks with dimensions of 250 cm×10 cm×3.5 cm, which were dried to a wood moisture content of ca. 12%, were impregnated analogously to comparative example 2 with the impregnating agent and subsequently were successively treated with superheated steam and heated under dry conditions according to the directions of example 1.

The pinewood planks thus obtained exhibited a nitrogen content N of 5.4 g/100 g of pinewood. The formaldehyde emission FA, determined using the bottle method according to EN 717, part 3, was 1.6 mg/100 g of pinewood. The ratio FA/N was correspondingly $0.25 \times 10^{-3}$. The degree of fixing was 30% (or 40% according to DIN EN 84).

EXAMPLE 5

A commercial aqueous composition of 1,3-bis(hydroxymethyl)-4,5-dihydroxy-imidazolidin-2-one (DMDHEU) was treated with ethylene urea and diluted with water so that the concentration of DMDHEU was 15% by weight and the concentration of ethylene urea was 7.5% by weight. The solution was mixed with 15 g/kg of $MgCl_2.6H_2O$. The solution thus obtained was used as impregnating agent in the following experiment.

Pinewood planks with dimensions of 250 cm×10 cm×3.5 cm, which were dried to a wood moisture content of ca. 12%, were impregnated analogously to comparative example 2 with the impregnating agent and subsequently were successively treated with superheated steam and heated under dry conditions according to the directions of example 1.

The pinewood planks thus obtained exhibited a nitrogen content N of 4.5 g/100 g of pinewood. The formaldehyde emission FA, determined using the bottle method according to EN 717, part 3, was 3.8 mg/100 g of pinewood. The ratio FA/N was correspondingly $0.84 \times 10^{-3}$. The degree of fixing was 51% (or 75% according to DIN EN 84).

EXAMPLE 6

4 kg of a commercial aqueous composition of 1,3-dimethyl-4,5-dihydroxyimidazolidin-2-one (40% by weight) were mixed with 2 kg of a commercial 70% by weight aqueous solution of a reaction product of melamine with formaldehyde and methanol (molar ratio 1:4:4) and 200 g of $MgCl_2.6H_2O$ and diluted with 3.7 kg of water. The solution thus obtained was used as impregnating agent in the following experiment.

Cubes of pine sapwood with dimensions of 2.5 cm×2.5 cm×2.5 cm, which were dried absolutely, were introduced into an impregnating plant. The impregnating plant was subjected for 30 minutes to a vacuum of 40 mbar absolute. Subsequently, the impregnating agent was run into the impregnating plant while maintaining a vacuum of 50 mbar absolute. Subsequently, a pressure of 10 bar was applied for 2 hours. The pressure phase was ended and the remaining liquid was removed.

The wood samples were then stored in a drying chamber, the temperature and air humidity of which can be controlled. The chamber was brought to 100° C. while maintaining a relative air humidity of 100%. Subsequently, the chamber was closed and heated to a dry-bulb temperature of 120° C. while maintaining a wet-bulb temperature of 100° C. These conditions were maintained until a uniform wood moisture content of approximately 8% was obtained. The chamber was then heated to a dry-bulb temperature of 130° C. with a heating rate of 5 K/h while maintaining a wet-bulb temperature of the steam of 100° C. These conditions were maintained until a uniform wood moisture content of approximately 6% was obtained. Subsequently, the superheated steam was withdrawn and replaced by fresh air while maintaining a temperature of 130° C., which reduced the relative air humidity to less than 10%. These conditions were maintained until a uniform wood moisture content of approximately 4% was obtained. Subsequently, the chamber temperature was reduced to 80° C. by blowing in fresh air. The chamber temperature was then reduced to 50° C. and the relative air humidity was adjusted to 50% by spraying with water. These conditions were maintained for 6 to 10 h in order to condition the wood.

The wood samples thus obtained exhibited a nitrogen content N of 8.30 g/100 g of pinewood. The formaldehyde emission FA, determined using the bottle method according to EN 717, part 3, was 2.2 mg/100 g of pinewood. The ratio FA/N was accordingly $0.26 \times 10^{-3}$. The degree of fixing was 73%.

EXAMPLE 7

The experiment was carried out analogously to example 6, cubes of beechwood being used instead of the cubes of pine sapwood. The wood samples thus obtained exhibited a nitrogen content N of 7.33 g/100 g of beechwood. The formaldehyde emission FA, determined using the bottle method according to EN 717, part 3, was 2.1 mg/100 g of beechwood. The ratio FA/N was correspondingly $0.28 \times 10^{-3}$. The degree of fixing was 70%.

EXAMPLE 8

3 kg of a commercial aqueous composition of 1,3-dimethyl-4,5-dihydroxyimidazolidin-2-one (40% by weight) were mixed with 2.7 kg of a commercial 70% by weight aqueous solution of a reaction product of melamine with formaldehyde and methanol (molar ratio 1:4:4) and 200 g of $MgCl_2.6H_2O$ and diluted with 4 kg of water. The solution thus obtained was used as impregnating agent in the following experiment.

The experiment was carried out analogously to example 6. The wood samples thus obtained exhibited a nitrogen content N of 9.27 g/100 g of pinewood. The formaldehyde emission FA, determined using the bottle method according to EN 717, part 3, was 7.8 mg/100 g of pinewood. The ratio FA/N was correspondingly $0.85 \times 10^{-3}$. The degree of fixing was 76%.

EXAMPLE 9

The experiment was carried out analogously to example 8, cubes of beechwood being used instead of the cubes of pine sapwood. The wood samples thus obtained exhibited a nitrogen content N of 7.87 g/100 g of beechwood. The formaldehyde emission FA, determined using the bottle method according to EN 717, part 3, was 4.6 mg/100 g of beechwood. The ratio FA/N was correspondingly $0.59 \times 10^{-3}$. The degree of fixing was 77%.

EXAMPLE 10

2.5 kg of a commercial aqueous composition of 1,3-bis (hydroxymethyl)-4,5-dihydroxy-imidazolidin-2-one (75% by weight) were mixed with 2 kg of a commercial 70% by weight aqueous solution of a reaction product of melamine with formaldehyde and methanol (molar ratio 1:4:4) and 200 g of $MgCl_2.6H_2O$ and diluted with 5.2 kg of water. The solution thus obtained was used as impregnating agent in the following experiment.

The experiment was carried out analogously to example 6. The wood samples thus obtained exhibited a nitrogen content N of 8.93 g/100 g of pinewood. The formaldehyde emission FA, determined using the bottle method according to EN 717, part 3, was 14.1 mg/100 g of pinewood. The ratio FA/N was correspondingly $1.58 \times 10^{-3}$. The degree of fixing was 82%.

EXAMPLE 11

The process was carried out analogously to example 10, cubes of beechwood being used instead of the cubes of pine sapwood. The wood samples thus obtained exhibited a nitrogen content N of 7.63 g/100 g of beechwood. The formaldehyde emission FA, determined using the bottle method according to EN 717, part 3, was 12.5 mg/100 g of beechwood. The ratio FA/N was correspondingly $1.66 \times 10^{-3}$. The degree of fixing was 86%.

EXAMPLE 12

2.1 kg of a commercial aqueous composition of 1,3-bis (hydroxymethyl)-4,5-dihydroxy-imidazolidin-2-one (75% by weight) were mixed with 0.9 kg of a commercial aqueous composition of 1-hydroxymethyl-4,5-dihydroxyimidazolidin-2-one (75% by weight) and 150 g of $MgCl_2.6H_2O$ and diluted with 7 kg of water. The solution thus obtained was used as impregnating agent in the following experiment.

The experiment was carried out analogously to example 6. The wood samples thus obtained exhibited a nitrogen content N of 3.84 g/100 g of pinewood. The formaldehyde emission FA, determined using the bottle method according to EN 717, part 3, was 4.4 mg/100 g of pinewood. The ratio FA/N was correspondingly $1.14 \times 10^{-3}$. The degree of fixing was 92%.

EXAMPLE 13

The process was carried out analogously to example 12, cubes of beechwood being used instead of the cubes of pine sapwood. The wood samples thus obtained exhibited a nitrogen content N of 2.74 g/100 g of beechwood. The formaldehyde emission FA, determined using the bottle method according to EN 717, part 3, was 2.8 mg/100 g of beechwood. The ratio FA/N was correspondingly $1.02 \times 10^{-3}$. The degree of fixing was 81%.

EXAMPLE 14

0.9 kg of a commercial aqueous composition of 1,3-bis (hydroxymethyl)-4,5-dihydroxy-imidazolidin-2-one (75% by weight) was mixed with 2.1 kg of a commercial aqueous composition of 1-hydroxymethyl-4,5-dihydroxyimidazolidin-2-one (75% by weight) and 150 g of $MgCl_2.6H_2O$ and diluted with 7 kg of water. The solution thus obtained was used as impregnating agent in the following experiment.

The experiment was carried out analogously to example 6. The wood samples thus obtained exhibited a nitrogen content N of 4.26 g/100 g of pinewood. The formaldehyde emission FA, determined using the bottle method according to EN 717, part 3, was 3.0 mg/100 g of pinewood. The ratio FA/N was correspondingly $0.70 \times 10^{-3}$. The degree of fixing was 95%.

EXAMPLE 15

The process was carried out analogously to example 14, cubes of beechwood being used instead of the cubes of pine sapwood. The wood samples thus obtained exhibited a nitrogen content N of 2.72 g/100 g of beechwood. The formaldehyde emission FA, determined using the bottle method according to EN 717, part 3, was 1.8 mg/100 g of beechwood. The ratio FA/N was correspondingly $0.65 \times 10^{-3}$. The degree of fixing was 82%.

EXAMPLE 16

3.0 kg of a commercial aqueous composition of 1-hydroxymethyl-4,5-dihydroxy-imidazolidin-2-one (75% by weight) were mixed with 150 g of $MgCl_2.6H_2O$ and diluted with 7 kg of water. The solution thus obtained was used as impregnating agent in the following experiment.

The experiment was carried out analogously to example 6. The wood samples thus obtained exhibited a nitrogen content N of 4.40 g/100 g of pinewood. The formaldehyde emission FA, determined using the bottle method according to EN 717, part 3, was 1.2 mg/100 g of pinewood. The ratio FA/N was correspondingly $0.27 \times 10^{-3}$. The degree of fixing was 88%.

EXAMPLE 17

The process was carried out analogously to example 14, cubes of beechwood being used instead of the cubes of pine sapwood. The wood samples thus obtained exhibited a nitrogen content N of 3.07 g/100 g of beechwood. The formaldehyde emission FA, determined using the bottle method according to EN 717, part 3, was 1.1 mg/100 g of beechwood. The ratio FA/N was correspondingly $0.36 \times 10^{-3}$. The degree of fixing was 86%.

What is claimed is:

1. A wooden material comprising a nitrogen compound, wherein said nitrogen compound is a formaldehyde addition product and is distributed in the wooden material in crosslinked form in a constituent amount (N) of at least 1% by weight, calculated as nitrogen and based on the total weight of the wooden material, wherein the ratio (FA/N) of formaldehyde emission (FA) of the wooden material, determined by means of the bottle method according to EN 717, part 3, to constituent amount of the nitrogen compound (N) exhibits a value of at most $3.5 \times 10^{-3}$, and wherein the wooden material has a degree of fixing of the nitrogen compound of more than 73%.

2. The wooden material according to claim 1, wherein the value of the formaldehyde emission is not more than 10 mg per 100 g of wooden material.

3. The wooden material according to claim 1, which exhibits a degree of fixing of the nitrogen compound of more than 85%.

4. The wooden material according to claim 1, wherein the constituent amount of the nitrogen compound, calculated as nitrogen and based on the weight of the wooden material, ranges from 1.5 to 20% by weight, based on the total weight of the wooden material.

5. The wooden material according to claim 4, wherein the constituent amount of the nitrogen compound, calculated as nitrogen and based on the weight of the wooden material, ranges from 2.3 to 12% by weight, based on the total weight of the wooden material.

6. The wooden material according to claim 1, wherein the chloride content, based on the weight of the wooden material used, is at most 0.1% by weight.

7. A process for the preparation of the wooden material according to claim 1, comprising
   a) impregnating the wooden material with an aqueous composition comprising i) at least one nitrogen compound, wherein said at least one nitrogen compound is a formaldehyde addition product, and ii) at least one substance which catalyzes crosslinking of the at least one nitrogen compound,
   b) treating the impregnated wooden material at elevated temperature in order to remove water and to crosslink the at least one nitrogen compound,
   wherein the process stage b) comprises at least one treatment of the impregnated wooden material with superheated steam and at least one subsequent treatment at a temperature of greater than 110° C. and a relative humidity of the gaseous medium surrounding the wooden material of at most 20%.

8. The process according to claim 7, wherein the concentration of the at least one nitrogen compound in the aqueous composition ranges from 10 to 60% by weight, based on the total weight of the composition.

9. The process according to claim 7, wherein the at least one nitrogen compound is selected from the group consisting of:
   a) low molecular weight compounds V which exhibit at least one N-bonded group of the formula $CH_2OR$, in which R is hydrogen or $C_1$-$C_4$-alkyl, and/or a 1,2-bishydroxyethane-1,2-diyl group bridging two nitrogen atoms;
   b) precondensates of the compound V;
   c) reaction products or mixtures of the compound V with at least one alcohol chosen from $C_1$-$C_6$-alkanols, $C_2$-$C_6$-polyols and oligoalkyleneglycols;
   d) mixtures of two or more of a), b) and c);
   e) mixtures of one or more of a), b) and c) with at least one compound V' exhibiting at least one free NH group; and
   f) mixtures of one or more of a), b) and c) with at least one compound V" exhibiting at least one OH group which is not present in the form of a $CH_2OH$ group.

10. The process according to claim 9, wherein the at least one nitrogen compound is selected from the group consisting of:
   i) 1,3-bis(hydroxymethyl)-4,5-dihydroxyimidazolidin-2-one (DMDHEU),
   ii) 1,3-bis(hydroxymethyl)-4,5-dihydroxyimidazolidin-2-one modified with a $C_1$-$C_6$-alkanol, a $C_2$-$C_6$-polyol or an oligoalkylene glycol,
   iii) 1,3-bis(hydroxymethyl)urea,
   iv) 1,3-bis(methoxymethyl)urea,
   v) 1-hydroxymethyl-3-methylurea,
   vi) 1-hydroxymethyl-3-methyl-4,5-dihydroxyimidazolidin-2-one
   vii) 1-hydroxymethyl-4,5-dihydroxyimidazolidin-2-one
   viii) 1,3-bis(hydroxymethyl)imidazolidin-2-one,
   ix) 1,3-bis(hydroxymethyl)-1,3-hexahydropyrimidin-2-one,
   x) 1,3-bis(methoxymethyl)-4,5-dihydroxyimidazolidin-2-one,
   xi) tetra(hydroxymethyl)acetylenediurea,
   xii) a low molecular weight melamine-formaldehyde resin,
   xiii) a low molecular weight melamine-formaldehyde resin modified with a $C_1$-$C_6$-alkanol, a $C_2$-$C_6$-polyol or an oligoalkylene glycol,
   xiv) mixtures of two or more of i) through xiii),
   xv) mixtures of one or more of i) through xiii) with at least one compound V' exhibiting at least one free NH group, and
   xvi) mixtures of one or more of i) through xiii) with at least one compound V" exhibiting at least one OH group which is not present in the form of a $CH_2OH$ group.

11. The process according to claim 7, wherein the at least one nitrogen compound is selected from the group consisting of:
   a) low molecular weight compounds V which exhibit at least two N-bonded groups of the formula $CH_2OR$, in which R is hydrogen or $C_1$-$C_4$-alkyl, and/or a 1,2-bishydroxyethane-1,2-diyl group bridging two nitrogen atoms,
   b) precondensates of the compound V,
   c) mixtures of a) and b), and
   d) mixtures of one or more of a) and b) with at least one compound V' exhibiting at least one free NH group.

12. The process according to claim 11, wherein the at least one nitrogen compound is selected from the group consisting of:
   i) 1,3-bis(hydroxymethyl)-4,5-dihydroxyimidazolidin-2-one,
   ii) 1,3-bis(hydroxymethyl)urea,
   iii) 1,3-bis(hydroxymethyl)imidazolidin-2-one,
   iv) tetra(hydroxymethyl)acetylenediurea,
   v) mixtures of two or more of i), ii), iii) and iv), and
   vi) mixtures of one or more of i), ii), iii) and iv) with a compound V' exhibiting at least one NH group.

13. The process according to claim 12, wherein the at least one nitrogen compound is 1,3-bis-(hydroxymethyl)-4,5-dihydroxyimidazolidin-2-one or a mixture thereof with a compound V'.

14. The process according to claim 7, wherein the at least one nitrogen compound is selected from a mixture comprising:
   a) at least one urea compound carrying a group of the formula $CH_2OR$ on one or both nitrogen atom(s) of the urea unit, in which R is hydrogen or $C_1$-$C_4$-alkyl, and
   b) at least one melamine compound carrying at least one group of the formula $CH_2OR$ on average on at least 2 of the amino groups of the melamine, in which R is hydrogen or $C_1$-$C_4$-alkyl.

15. The process according to claim 7, wherein the at least one nitrogen compound is selected from a mixture comprising:
   a) at least one urea compound carrying a group of the formula $CH_2OR$ on one of the two nitrogen atoms of the urea unit, in which R is hydrogen or $C_1$-$C_4$-alkyl, and
   b) at least one urea compound carrying a group of the formula $CH_2OR$ on both nitrogen atoms of the urea unit, in which R is hydrogen or $C_1$-$C_4$-alkyl.

16. The process according to claim 7, wherein the at least one nitrogen compound is selected from a mixture comprising:
   a) at least one nitrogen compound selected from the group consisting of melamine compounds carrying at least one group of the formula $CH_2OR$ on average on at least 2 of the amino groups of the melamine, and urea compounds carrying a group of the formula $CH_2OR$ on one or both nitrogen atom(s) of the urea unit, in which R is hydrogen or $C_1$-$C_4$-alkyl, and
   b) at least one compound V' selected from the group consisting of urea, N-methylurea, ethylene urea (imidazolin-2-one), propylene urea, 4,5-bishydroxyimidazolin-2-one and N-methyl-4,5-bishydroxyimidazolin-2-one.

17. The process according to claim 7, wherein the at least one nitrogen compound is selected from a mixture comprising:
   a) at least one nitrogen compound selected from the group consisting of melamine compounds carrying at least one group of the formula $CH_2OR$ on average on at least 2 of the amino groups of the melamine, and urea compounds carrying a group of the formula $CH_2OR$ on one or both nitrogen atom(s) of the urea unit, in which R is hydrogen or $C_1$-$C_4$-alkyl, and
   b) at least one compound V" selected from the group consisting of 4,5-bishydroxyimidazolin-2-one, N-methyl-4,5-bishydroxyimidazolin-2-one and 1,3-dimethyl-4,5-bishydroxyimidazolin-2-one.

18. The process according to claim 7, wherein the catalyst is selected from the group consisting of metal halides, metal sulfates, metal nitrates, metal phosphates, metal tetrafluoroborates, boron trifluoride, ammonium halides, ammonium sulfate, ammonium oxalate, diammonium phosphate, organic carboxylic acids, organic sulfonic acids, boric acid, phosphoric acid, sulfuric acid and hydrochloric acid.

19. The process according to claim 18, wherein the catalyst does not comprise any chlorides.

20. The process according to claim 7, wherein the wooden material is a solid wooden article.

21. The process according to claim 7, wherein the wooden material is a wood veneer or a finely divided material.

22. A wooden material, obtained by the process according to claim 7, comprising a nitrogen compound, wherein said nitrogen compound is a formaldehyde addition product and is distributed in the wooden material in crosslinked form in a constituent amount (N) of at least 1% by weight, calculated as nitrogen and based on the total weight of the wooden material, wherein the ratio (FA/N) of formaldehyde emission (FA) of the wooden material, determined by means of the bottle method according to EN 717, part 3, to constituent amount of the nitrogen compound (N) exhibits a value of at most $3.5 \times 10^{-3}$, and wherein the wooden material has a degree of fixing of the nitrogen compound of more than 73%.

23. The wooden material according to claim 1, wherein the nitrogen compound is present, at least, in the cell vacuoles of particles of the wooden material.

* * * * *